United States Patent [19]

Adachi et al.

[11] Patent Number: 5,686,780
[45] Date of Patent: Nov. 11, 1997

[54] BRUSH HOLDER INTEGRATED WITH VOLTAGE REGULATOR FOR A VEHICLE AC GENERATOR

[75] Inventors: Katsumi Adachi; Ryuichi Ikeda; Kyoko Kurusu, all of Tokyo-to, Japan

[73] Assignee: Mitsubishi Denki Kabushiki Kaisha, Tokyo, Japan

[21] Appl. No.: 550,680

[22] Filed: Oct. 31, 1995

[30] Foreign Application Priority Data

Jun. 3, 1995 [JP] Japan ................ 7-045969

[51] Int. Cl.⁶ .......................... H02K 11/00
[52] U.S. Cl. ............... 310/68 D; 310/682; 310/239; 310/71
[58] Field of Search ................ 310/68 D, 68 R, 310/239

[56] References Cited

U.S. PATENT DOCUMENTS

| | | | |
|---|---|---|---|
| 4,169,282 | 9/1979 | Alport et al. | 363/145 |
| 4,504,752 | 3/1985 | Iwaki et al. | 310/68 |
| 4,606,000 | 8/1986 | Steele et al. | 363/145 |
| 4,683,390 | 7/1987 | Imori et al. | 310/71 |
| 4,799,309 | 1/1989 | Cinzori et al. | 29/596 |
| 4,818,906 | 4/1989 | Kitamura et al. | 310/58 |
| 5,095,235 | 3/1992 | Kitamura | 310/68 D |
| 5,194,770 | 3/1993 | Yoshioka et al. | 310/51 |
| 5,227,688 | 7/1993 | Gotoh | 310/239 |
| 5,258,673 | 11/1993 | Gotoh | 310/68 D |
| 5,345,132 | 9/1994 | Sasaki et al. | 310/239 |

FOREIGN PATENT DOCUMENTS

| | | |
|---|---|---|
| 484287 | 6/1992 | European Pat. Off. . |
| 587308 | 3/1994 | European Pat. Off. . |
| 5219704 | 8/1993 | Japan ............ 310/68 D |
| 6 14500 | 1/1994 | Japan ............ 310/68 D |

OTHER PUBLICATIONS

Patent Abstracts Of Japan, vol. 14, No. 67 (E–0885), Feb. 7, 1990 & JP 01 286755 A (Hitachi), Nov. 17, 1989.
Patent Abstracts Of Japan, vol. 5, No. 78 (E–58), May 22, 1981, & JP 56 025360 A (Nippon Denso), Mar. 11, 1981.

*Primary Examiner*—Clayton E. LaBalle
*Assistant Examiner*—Elvin G. Enad
*Attorney, Agent, or Firm*—Sughrue,Mion,Zinn,Macpeak & Seas, PLLC

[57] ABSTRACT

A voltage regulating circuit is provided in a single mold package, which is attached to the case directly or by a heat conductive material such that it is sandwiched between the case of a voltage regulator and a heat sink, conductors which serve as internal wirings and form terminals are insert-molded with the case of the voltage regulator and the brush holder to be superimposed upon the case of the voltage regulator, out of the terminals formed in the conductors, specific terminals on respective sides are aligned, and the brush holder is installed in the case of the voltage regulator in such a manner that they are superimposed upon each other so that electrical connection of these elements is effected.

19 Claims, 12 Drawing Sheets

BRUSH HOLDER INTEGRATED WITH VOLTAGE REGULATOR FOR A VEHICLE AC GENERATOR

BACKGROUND OF THE INVENTION

1. [Field of the Invention]

This invention relates to an AC generator for use in a vehicle such as a car and, more particularly, to a voltage regulator for an AC generator for use in a vehicle.

2. [Description of the Prior Art]

FIG. 14 is a sectional view of a general AC generator for use in a vehicle. In the figure, reference numeral 1 represents a front bracket, and 2 a rear bracket, both of which form the outer shell of a generator. Reference numeral 3 represents a rotor which is composed of a rotary axis 31, Lundell field cores 32 and 33, a field coil 34, slip rings 35, and cooling fans 36 and 37 fixed on each side of the field cores 32 and 33. Both ends of the rotary axis 31 are supported by the front bracket 1 and the rear bracket 2 through bearings 41 and 42. Reference numeral 5 represents an armature which is held between the front bracket 1 and the rear bracket 2 and formed of an armature core 51 and an armature coil 52. Numeral 6 designates a voltage regulator which will be described hereinafter and which is attached to the rear bracket 2 and regulates the output voltage of the armature coil 52 by controlling the field current of the field coil 34. Numeral 7 designating a rectifier which comprises diode groups 71 and 72, is attached to the rear bracket and rectifies the AC output of the armature coil 52. Its output voltage is supplied to the voltage regulator as a regulated voltage. Connections of these elements are effected by a circuit board 73. Numeral 65 representing a brush holder for holding a brush 651, is integrated with the voltage regulator 6 as is described hereinafter. Numeral 74 represents a fan guide integrated with the rectifier 7 as a ventilation flue member for the cooling fan 37.

FIG. 15 is a plan view of the voltage regulator 6 and the brush holder 65, FIG. 16 is a partial sectional view of FIG. 15 when seen from the top, and FIG. 17 is a rear view of FIG. 15. In these figures, reference numeral 61 represents a case for the voltage regulator molded from an insulating material. A circuit housing 62 for housing the voltage regulating circuit board 621, a connector case 63, a capacitor case 64 for housing a capacitor 641 and the brush holder 65 are molded integrated with the case 61. A conductor 611 is insert-molded with the case 61 and serves to wire elements installed in the case 61 and form terminals exposed from the case 61 where required as well as unshown connectors protruding within the connector case 63. Reference numeral 652 represents a cap for covering one end of the brush holder 65, 67 a cap holder for fixing this cap 652 which is attached to the rear bracket 2 together with the voltage regulator 6.

The voltage regulating circuit board 621 consists of a hybrid IC for mounting an IC chip, fixed to a heat sink 622 with an adhesive or the like and connected to the conductor 611 by a lead terminal 623. The heat sink 622 is attached to cover the opening of the circuit housing 62 which is filled with a sealing resin 68 to protect the voltage regulating circuit board 621. In this way, the voltage regulating circuit board 621 is intended to mount a semiconductor chip on a ceramic substrate and comprises a power element for controlling a field current of the field coil 34. Therefore, it requires heat radiation- and temperature variation-resistant structures. The voltage regulating circuit board 621 is bonded to the heat sink 622 to have a heat radiation structure and, accordingly, it requires a lead terminal 623 for its connection to another electric circuit. To withstand temperature variations, a soft resin is used as the sealing resin 68 for protection so as to reduce stress applied to semiconductor parts mounted on the board.

The voltage regulator for a conventional AC generator for use in a vehicle structured as described above needs to use a soft resin as the sealing resin 68 and the lead terminal 623 for relatively long-distance connections. Therefore, it cannot be said that the regulator has satisfactory vibration resistance as a regulator for an internal combustion engine for use in a greatly vibrating vehicle. Further, there is a production problem that most of assembly processes such as bonding of the voltage regulating circuit board 621 to the heat sink 622 and soldering of the lead terminal 623 to the conductor 611 need to be carried out manually. In addition, since the brush holder 65 is integrated with the case 61, the installation of the brush holder 65 in the generator is easy, but the entire regulator must be replaced when a brush or brush holder is to be exchanged due to a worn-out brush, resulting in waste of resources and an increased burden on users.

SUMMARY OF THE INVENTION

This invention has been made to solve the above problems, and it is therefore a first object of the invention to provide a voltage regulator for an AC generator for use in a vehicle which is excellent in vibration resistance, heat resistance and weather resistance and can be reduced in size.

A second object of the invention is to improve the maintenance ease of a voltage regulator by separating a brush holder from the case of the voltage regulator without detracting assembly ease.

Another object of the invention is to improve the assembly ease of the voltage regulator and the rectifier, reduce the number of parts and improve reliability.

In the AC generator for use in a vehicle according to the present invention, which comprises a case formed from an insulating material and including a circuit housing for housing a voltage regulating circuit for regulating the output voltage of a generator and a connector case for housing a connector as an integrated unit, a brush holder formed from an insulating material, for housing the brush of the generator, conductors insert-molded within the case, for electrically connecting elements such as a voltage regulating circuit, forming connectors within the connector case and forming connection terminals where required, an insert conductor insert-molded with the brush holder and forming connection terminals and internal wirings, and a heat sink for covering the opening of the circuit housing and cooling the voltage regulating circuit, the voltage regulating circuit is provided in a mold package having terminals which are directly connected to the terminals formed in the case conductors, fixed to the circuit housing together with the heat sink in close contact therewith directly or with a heat conducting material, and attached to the bracket of the generator while the brush holder is superimposed upon the case.

Terminals to be insert-molded are provided in the brush holder separate from the case of the voltage regulator and electrically connected to the terminals of the wiring conductors which are inserted into the case when the brush holder is installed in the case of the voltage regulator in such a manner that it is superimposed upon the case.

Further, the cap holder of the brush holder is molded with the case of the voltage regulator as an integrated unit and the brush holder is attached to the bracket of the generator in such a manner that it is superimposed upon the case of the voltage regulator, whereby the cap of the brush holder is fixed in a radial direction.

Further, a circular arc-shaped flat portion is provided in the brush holder so that it faces the blade of the cooling fan and constitutes a fan guide together with a flat portion provided in the connector housing of the case when the brush holder is installed such that it is superimposed upon the case of the voltage regulator, and a ventilation flue is formed between this fan guide and the voltage regulator.

Moreover, the heat sink installed in the mold package as the voltage regulating circuit can be attached to the rear bracket cooled by outside air so that it is in close contact with the rear bracket, thereby making it possible to enhance the heat radiation effect of the voltage regulating circuit.

In the voltage regulator for an AC generator for use in a vehicle structured above, since the voltage regulating circuit is provided in a mold package, single in-line terminals are connected to conductors which are inserted directly into the case, and the voltage regulating circuit is installed such that it is in close contact with the heat sink and the case, vibration resistance and heat radiation effects are good and the size of the voltage regulator can be reduced.

Use of the mold package can improve weather resistance such as waterproof property due to the multiplication effect of the sealing resin and the mold resin.

Further, the voltage regulating circuit and the brush can be electrically connected simply by installing the brush holder in the case of the voltage regulator in such a manner that it is superimposed upon the case and the cap holder of the brush holder is integrated with the case of the voltage regulator, thereby making easy and making possible the automation of assembly work.

Cooling air absorbed from the hole of the rear bracket by the cooling fan of the generator runs through a ventilation flue between the fan guide and the voltage regulator to cool the voltage regulator on the side of the fin of the heat sink and flows into the armature coil and the air outlet of the rear bracket.

The above and other objects, features and advantages of the invention will become more apparent from the following description when taken in conjunction with the accompanying drawings.

DESCRIPTION OF THE PREFERRED EMBODIMENT

EMBODIMENT 1

Figure 1:
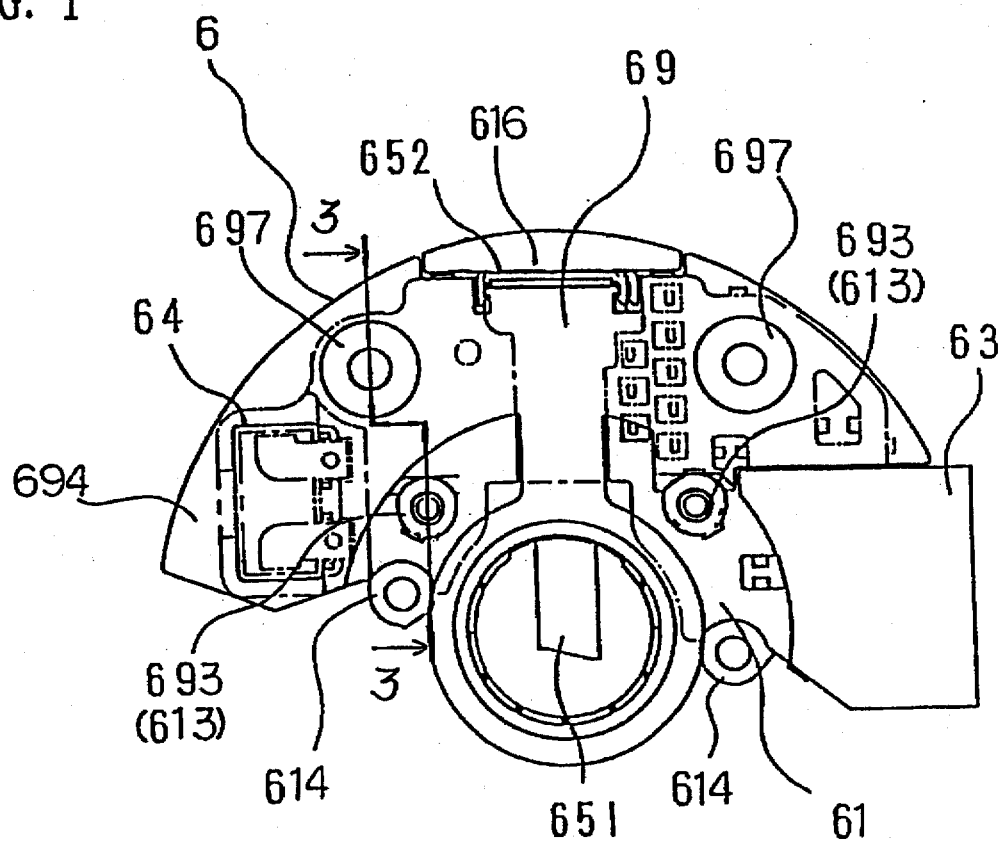
FIG. 1 is a plan view of a voltage regulator according to Embodiment 1 of the present invention when assembled.
Figure 2:
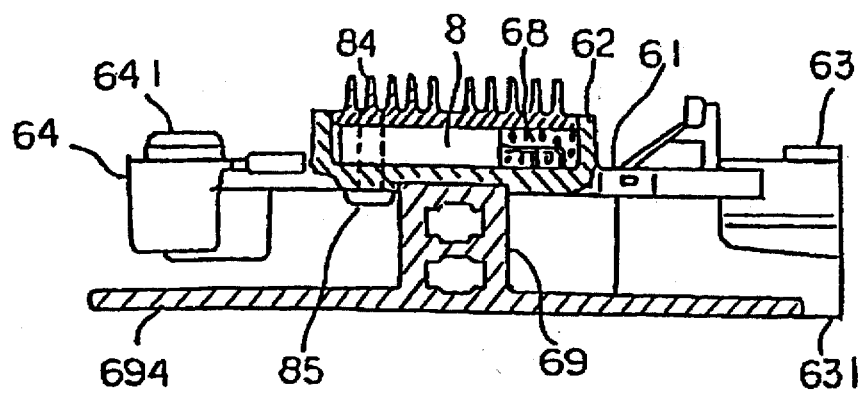
FIG. 2 is a partial sectional view of FIG. 1 when seen from the top.
Figure 3:
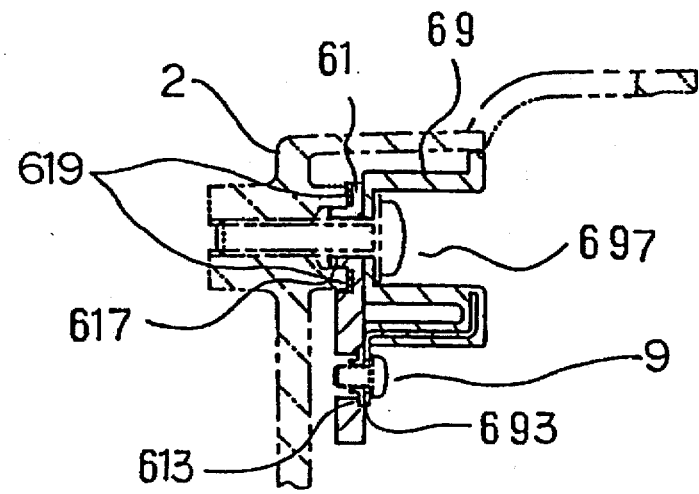
FIG. 3 is a sectional view of FIG. 1 taken on portion 3—3.
Figure 4:
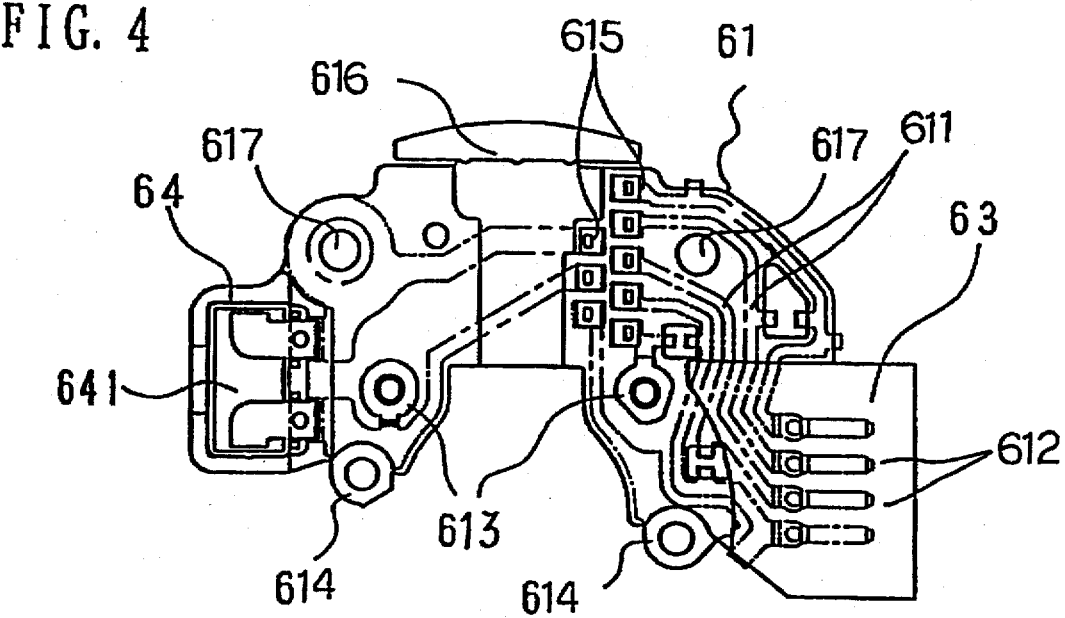
FIG. 4 is a plan view of the case of the voltage regulator of Embodiment 1.
Figure 5:
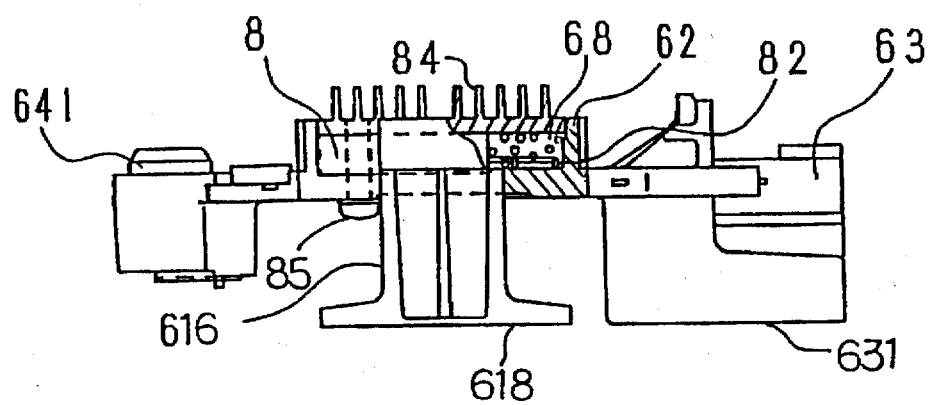
FIG. 5 is a partial sectional view of FIG. 4 when seen from the top.
Figure 6:
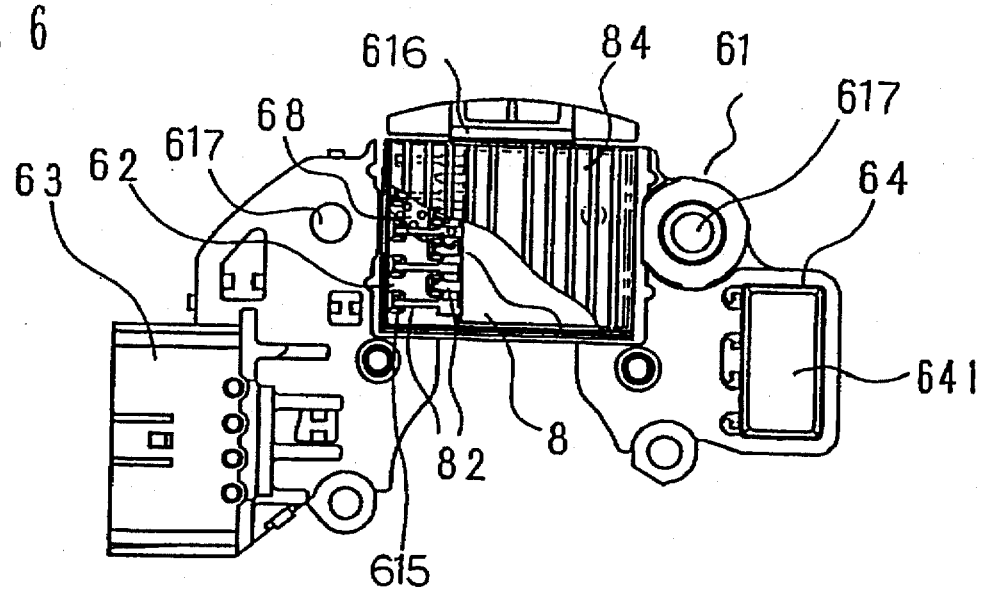
FIG. 6 is a rear view of the case of the voltage regulator of FIG. 4.
Figure 7A:
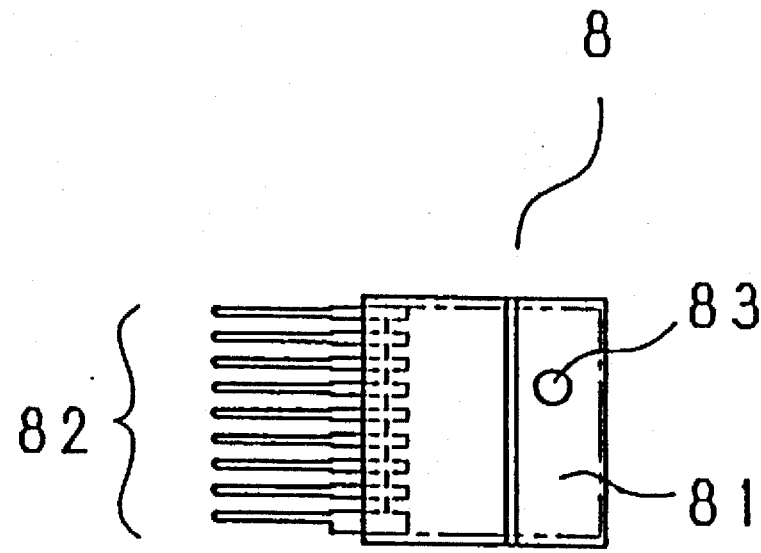
FIG. 7(a),(b) are diagrams for explaining a mold package used in the present invention.
Figure 7B:
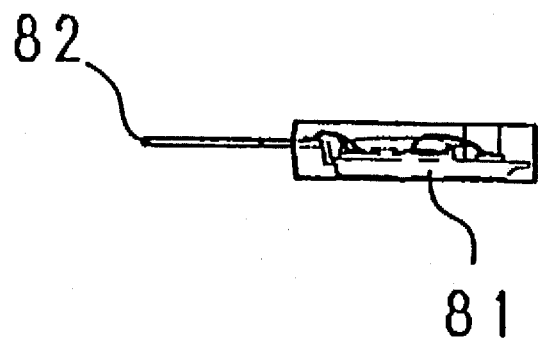
Figure 8:
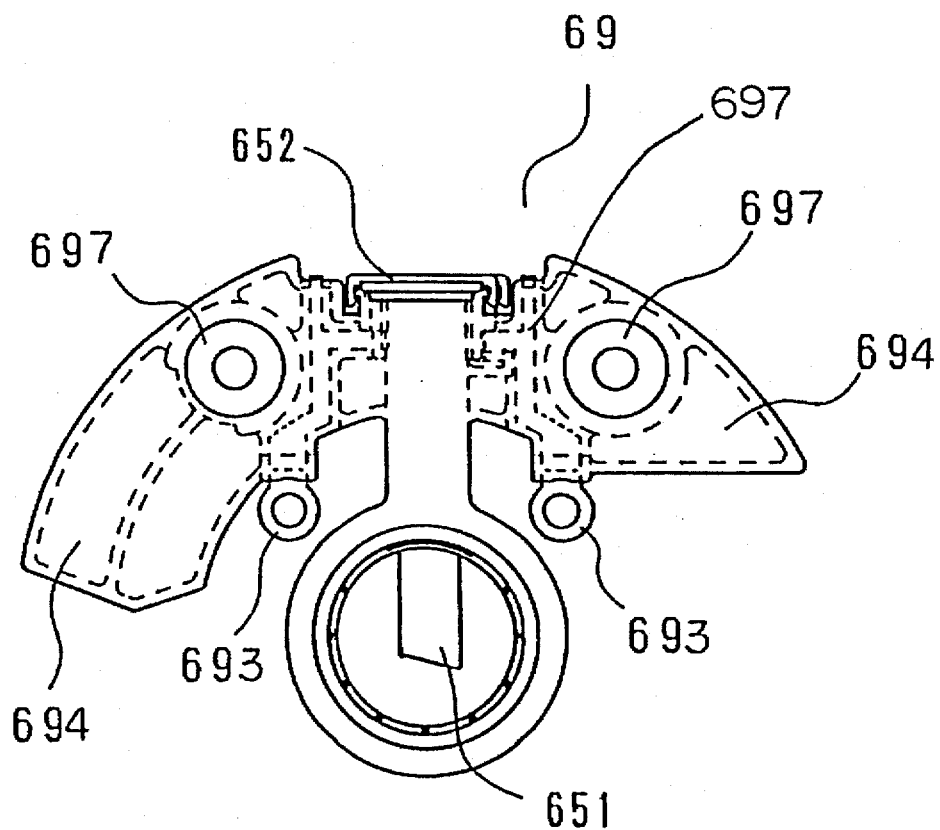
FIG. 8 is a plan view of a brush holder used in Embodiment 1.
Figure 9:
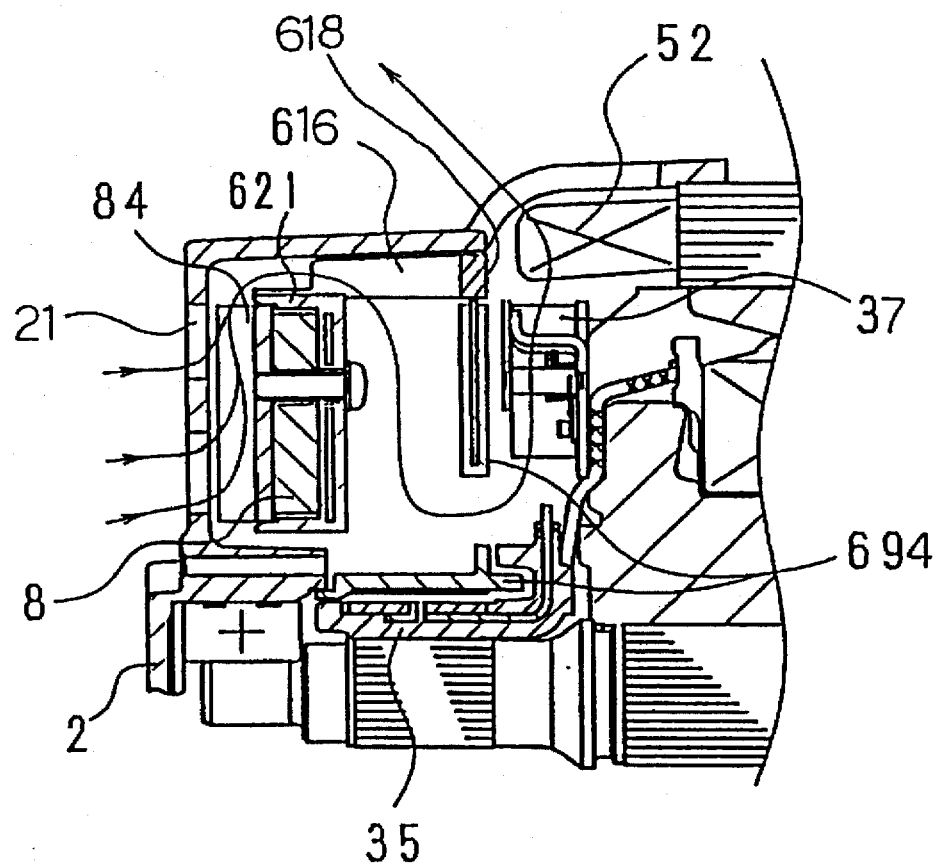
FIG. 9 is a sectional view of the voltage regulator of Embodiment 1 when installed in a generator.

FIG. 1 is a plan view of a voltage regulator when installed in an AC generator for use in a vehicle according to an embodiment of the present invention, FIG. 2 is a partial sectional view of FIG. 1 when seen from the top, FIG. 3 is a sectional view of FIG. 1 taken on portion 3—3, FIG. 4 is a plan view of a voltage regulating section excluding a brush holder shown in FIG. 1, FIG. 5 is a partial sectional view of FIG. 4 when seen from the top, and FIG. 6 is a rear view of FIG. 4. FIG. 7(a),(b) show the shape of a mold package used in the present invention, FIG. 8 is a plan view of the brush holder of FIG. 1, and FIG. 9 is a sectional view of the embodiment shown in FIGS. 1 to 8 when attached to the rear bracket of a generator. The same elements are given the same reference numerals in the above figures including the figures of the prior art.

Figure 14:
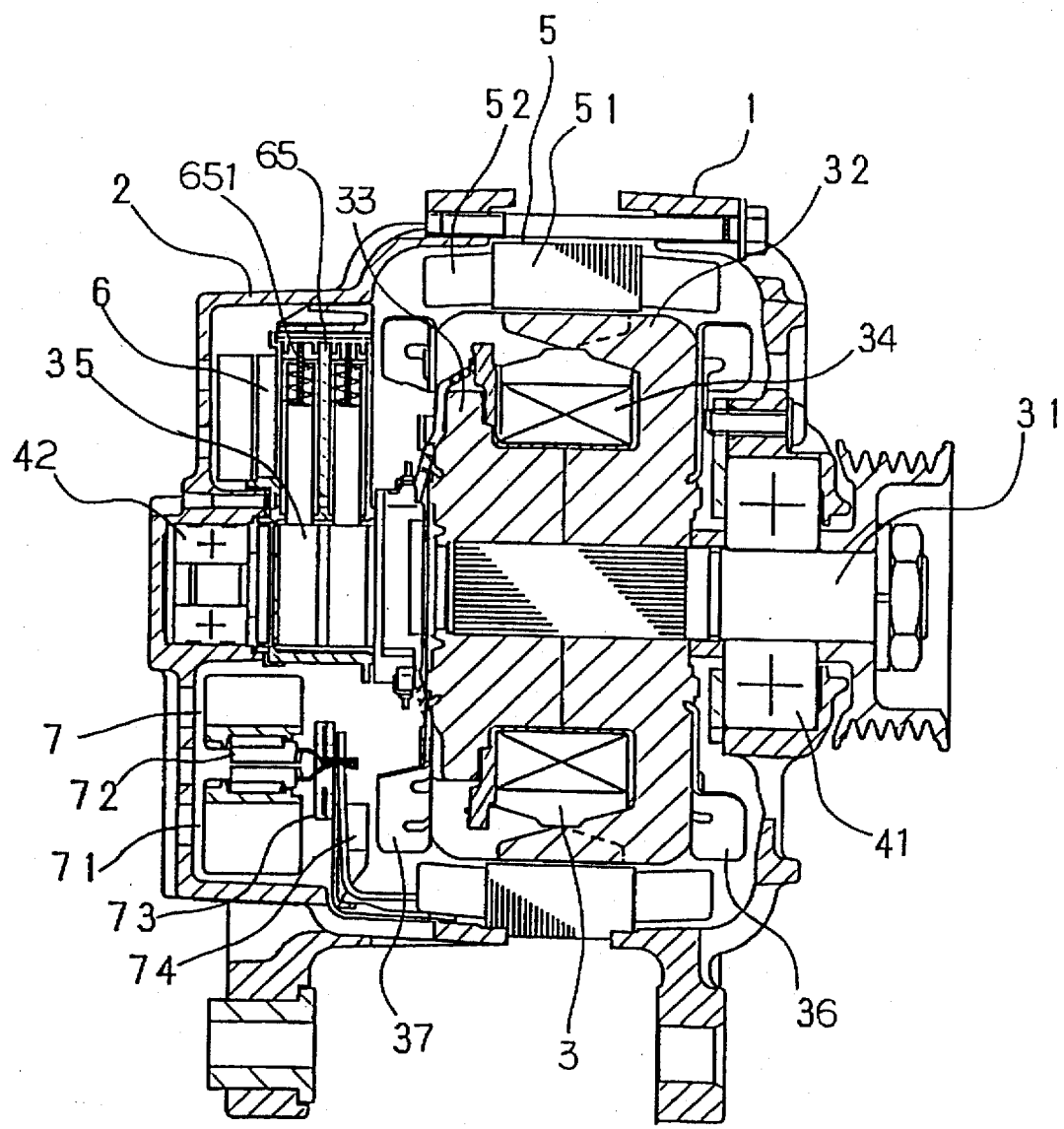
FIG. 14 is a sectional view of the general structure of an AC generator for use in a vehicle.
Figure 15:
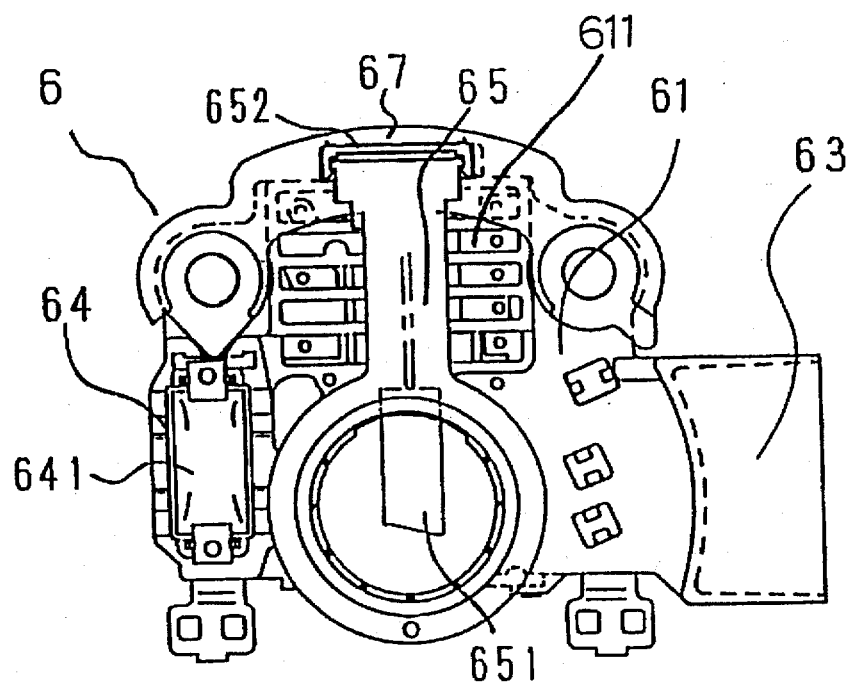
FIG. 15 is a plan view of a voltage regulator of the prior art.
Figure 16:
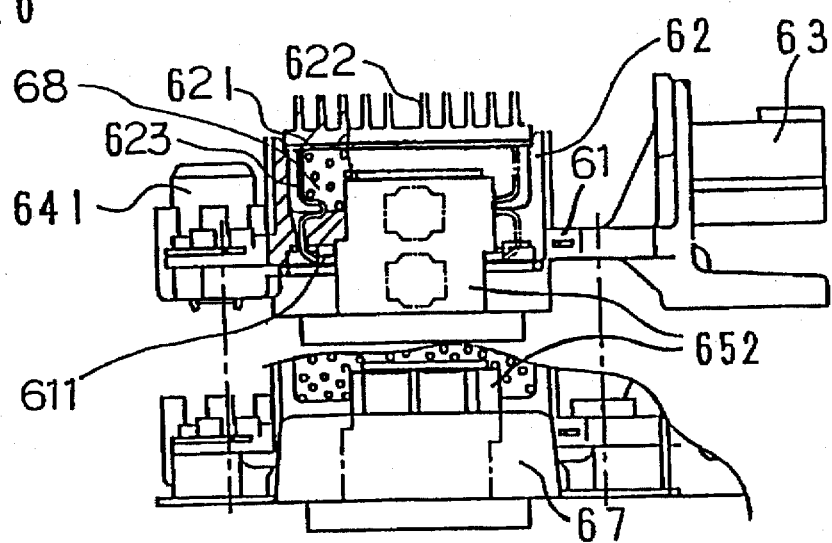
FIG. 16 is a partial sectional view of FIG. 15 when seen from the top.
Figure 17:
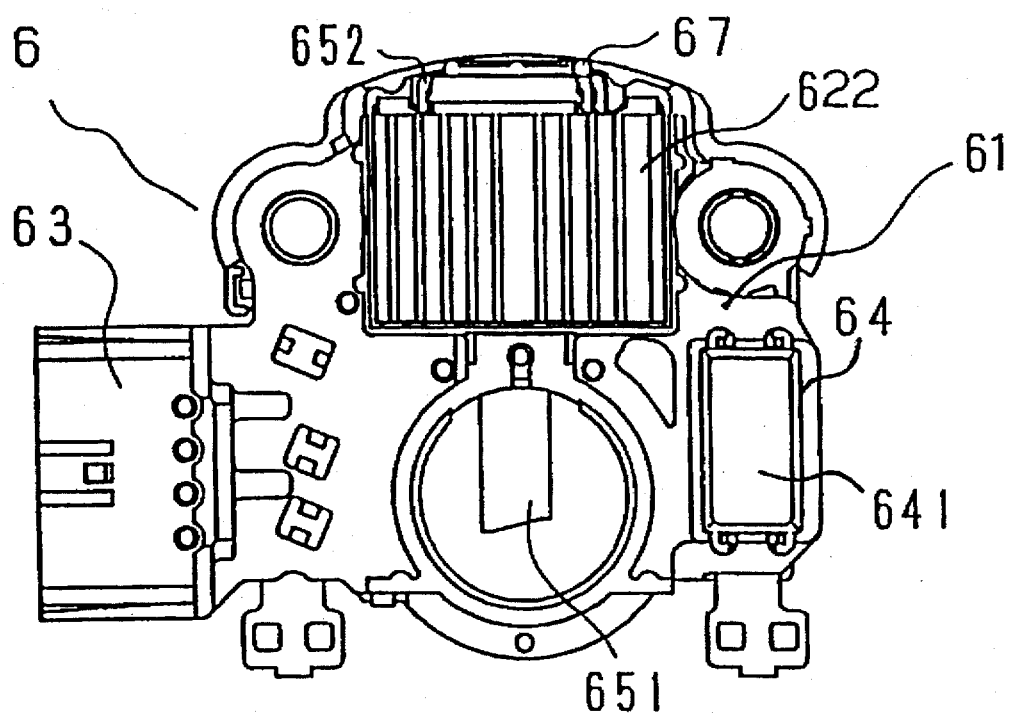
FIG. 17 is a rear view of the voltage regulator of FIG. 15.

FIG. 1 shows a voltage regulator in which the brush holder 69 shown in FIG. 8 is combined with the case 61 of the voltage regulator as a separate unit. In these figures, the case 61 of the voltage regulator 6 is molded from an insulating material and includes: a circuit housing 62 for housing a mold package 8 forming a voltage regulating circuit, a connector case for housing a connector to be described hereinafter, and a capacitor case 64 for housing a capacitor 641 as an integrated unit. Conductors 611 are insert-molded within the case 61 and serve to electrically interconnect elements which are attached to the case 61 with the voltage regulator 6. Conductors 611 form protruding connectors 612 in the connector case and terminals 613, 614 and 615 exposed from the case 61 where required. A cap holder 616 for a brush holder 69 is integrated with the case 61 and will be described hereinafter. An attachment hole 617 is provided in the case 61. The brush holder 69 is molded from an insulating material and incorporates the insert conductor 691 which partially forms a terminals 693 and electrically connects the brush 651 and the terminals 693. A circular arc-shaped flat portion 694 is provided in the brush holder 69 on a surface of a side opposite to the side thereof where the attachment hole 697 is provided. When the brush holder 69 is installed in the case 61, the attachment hole 697 aligns with the hole 617 of the case 61 and the terminal 693 aligns with the terminal 613 of the case 61. A cap 652 covers one end of the hole for accepting the brush of the brush holder 69. The mold package 8, as shown in FIG. 7(a),(b), consists of a main body 81, obtained by molding a substrate of an insulating material, to form a semiconductor circuit, and terminals 82 which have an in-line structure. A hole 83 is provided in part of the main body 81 and, as shown in FIGS. 5 and 6, the terminals 82 are bent and inserted into holes formed in the terminal 615 of the case 61. A heat sink 84 is bonded directly, or via a heat conducting material, to the circuit housing 62, and the mold package 8. The molded package 8 and the heat sink 84 are fixed to the case 61 by a screw 85 through the hole 83. The space surrounding the circuit housing 62 and the heat sink 84 is filled with a sealing resin. The terminal 614 provides connection to the rectifier 7 as shown in FIG. 14.

In the voltage regulator for an AC generator for use in a vehicle structured above, the brush holder 69 is superimposed upon the case 61 of the voltage regulator, the attachment hole 617 of the case 61 for the voltage regulator is aligned with the attachment hole 697 of the brush holder 69 so that the voltage regulator is attached to the rear bracket 2 of the generator. As a result, as shown in FIGS. 1 and 3, the terminal 613 of the case 61 is electrically connected to the terminal 693 of the brush holder 69 and at the same time, the cap 652 of the brush holder 69 is fixed by the cap holder 616. As shown in FIG. 3, a tap is provided on the terminal 613 so that the terminal is screwed with a screw 9 for perfect electrical connection.

As shown in FIG. 5, an end surface 618 of the cap holder 616 is made flush with an end surface 631 of the connector case 63. The flat portion 694 of the brush holder 69 is also made flush with the end surface 631 when the brush holder 69 is installed as shown in FIG. 2. As shown in FIG. 9, cooling air generated by the cooling fan 37 of the generator enters from an intake port 21 of the rear bracket 2, passes through the fin of the heat sink 84 to cool the heat sink and passes between the flat portion 694 of the brush holder 69 and the circuit housing 62 to cool the armature coil 52. The main body 81 of the mold package 8 is sandwiched between the circuit housing 62 of the case 61 and the heat sink 84 and radiates heat to the heat sink 84. The circuit housing 62 and the heat sink 84 are cooled by cooling air, thereby improving the cooling effect of the voltage regulator.

Since the mold package 8 of the voltage regulating circuit is sandwiched between the circuit housing 62 and the heat sink 84 as described above and its terminals 82 are connected to the terminals 615, which communicate directly with the conductors 611 of the case 61, vibration resistance is improved and weather resistance such as the waterproof property is also improved by the multiplication effect of the mold resin covering the mold package 8 and the sealing resin 68.

EMBODIMENT 2

Figure 10:
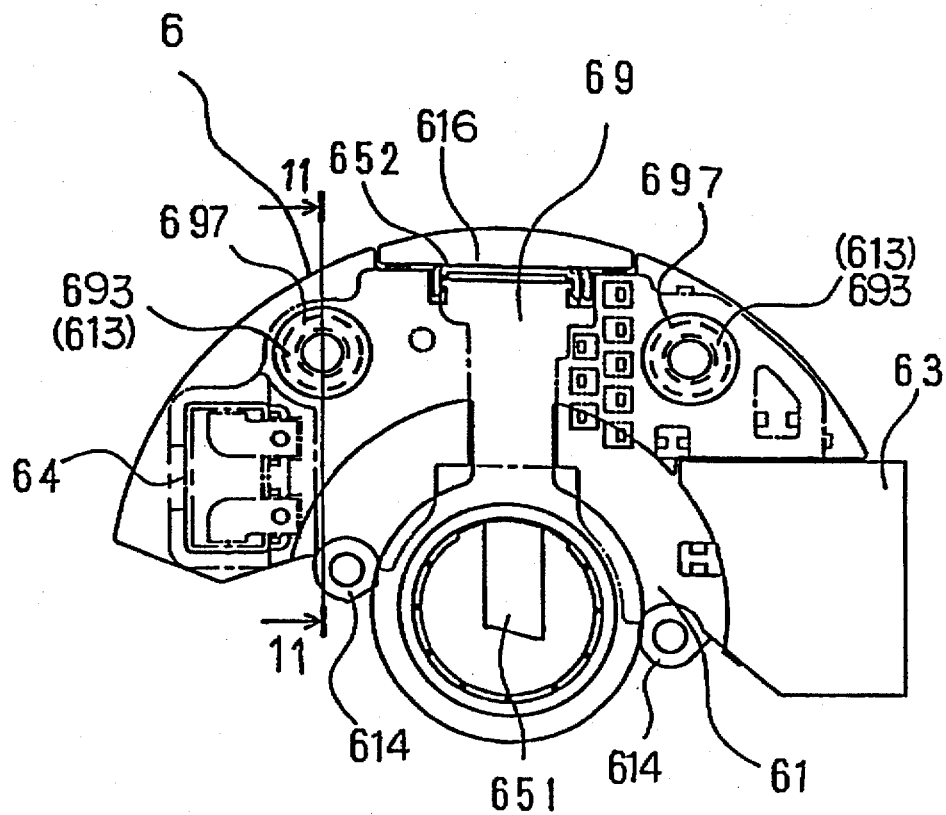
FIG. 10 is a plan view of Embodiment 2 of the present invention.
Figure 11:
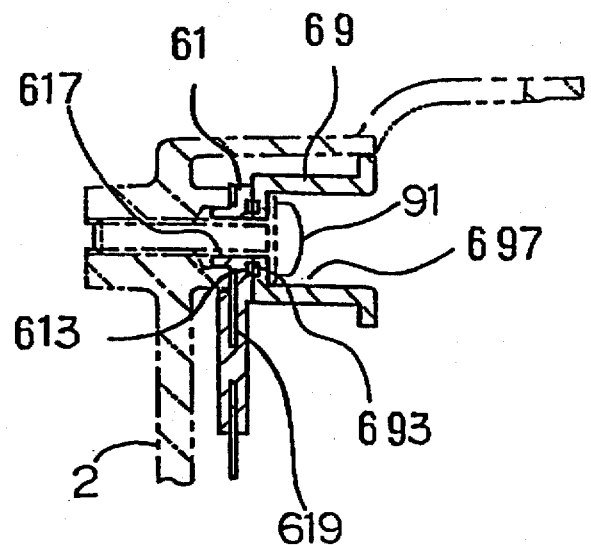
FIG. 11 is a sectional view of FIG. 10 on portion 11—11.

FIG. 10 is a plan view of Embodiment 2 of the present invention. FIG. 11 is a sectional view of FIG. 10 taken on portion 11—11. In this embodiment, the terminal 613 is exposed on the surface of the brush holder 69 around the attachment hole 617 of the case 61 and the terminal 693 is exposed on the surface of the the case 61 around the attachment hole 697 of the brush holder 69. Further, the conductor 619, required to be grounded, is structured the same as in Embodiment 1 and provided in the case 61 near the attachment hole 617 on the side of the rear bracket 2. In this embodiment, the case 61 and the brush holder 69 are attached to the rear bracket 2 in such a manner that they are superimposed upon each other and fastened with a screw 91 so that the terminal 613 and the terminal 693 are press contacted to each other. This design provides installation and electrical connection between these terminals at the same time.

EMBODIMENT 3

Figure 12:
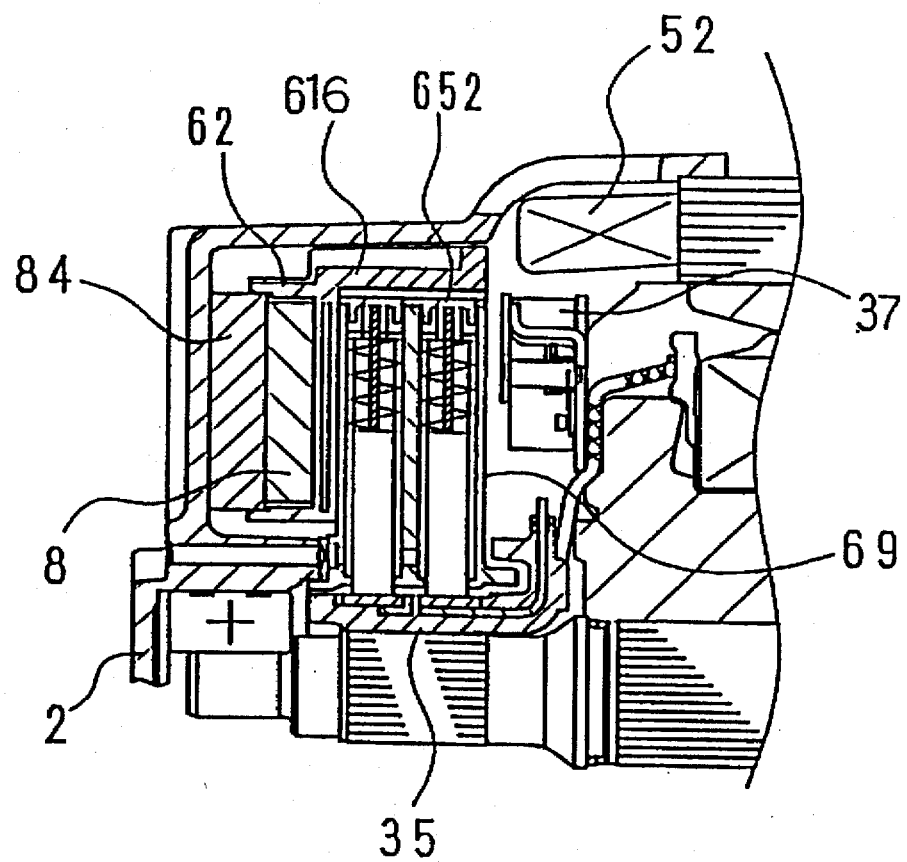
FIG. 12 is a sectional view of Embodiment 3 of the present invention.

FIG. 12 is a sectional view of Embodiment 3 of the present invention. In this embodiment the cooling fin of the heat sink 84 is eliminated and the heat sink 84 is attached to the rear bracket 2 directly, or through a heat conductive material, so that a top surface of the heat sink 84 comes into close contact with the rear bracket 2. Heat radiation is the same as in Embodiments 1 and 2 except that heat is transmitted to the rear bracket 2. According to this embodiment, the size of the voltage regulator can be reduced to such an extent that it is flush with the fin of the heat sink 84.

EMBODIMENT 4

Figure 13:
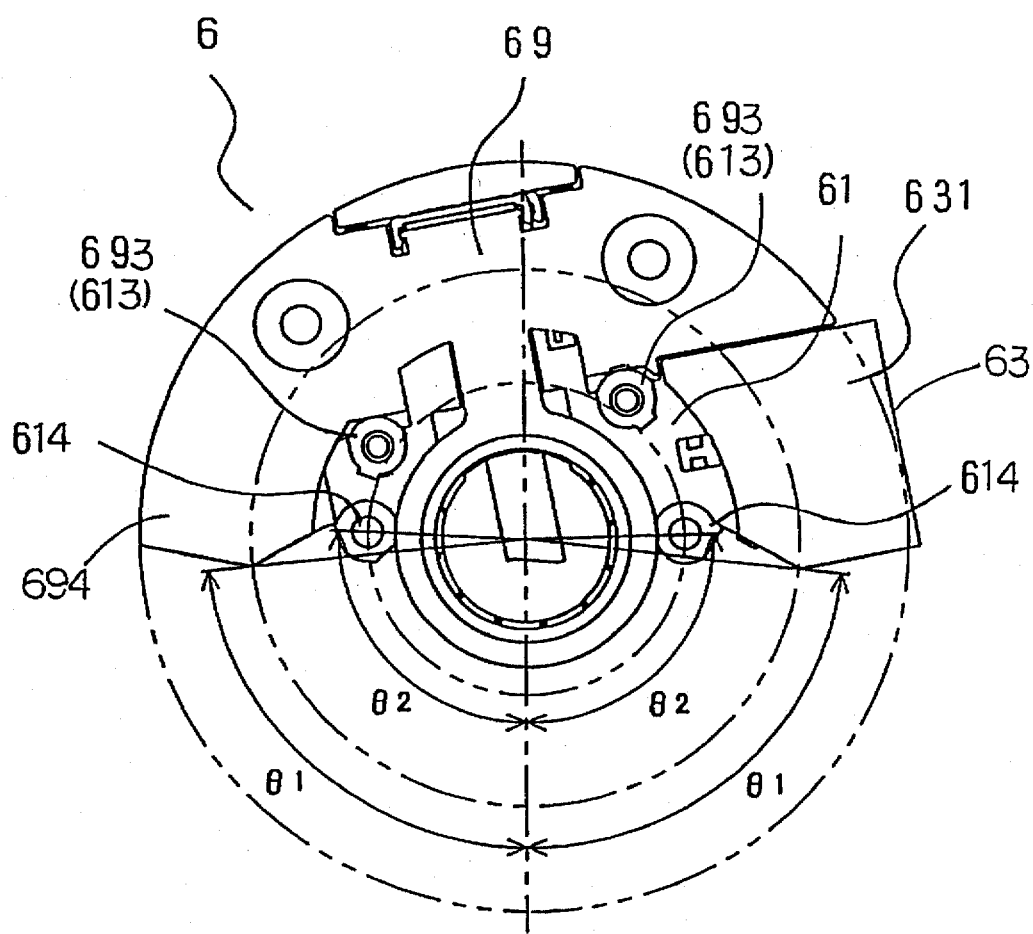
FIG. 13 is a plan view of Embodiment 4 of the present invention.

FIG. 13 shows the positional relationship of the terminals 614, also shown in FIGS. 1 and 4. As shown in FIG. 13, the terminals 614 are arranged symmetrically at an angle of θ2 from a line passing the center of an axis from a position apart by the same angle of θ1 from both end portions of the fan guide which is formed by the end surface 631 of the connector case 63 and the flat portion 694 of the brush holder 69, i.e., a line passing the center of the axis and dividing the fan guide into two portions in a circumferential direction. The fan guide 74 provided on the rectifier 7 shown in FIG. 14 has a circular arc with an angle substantially twice as large as θ1, as shown in FIG. 13 formed along the entire circumference by the flat portion 694 of the brush holder 69 and the end surface 631 of the connector case 63. Different types of rectifiers can be combined with the voltage regulator by setting the positions of the terminals 614 for connecting the rectifier 7 as described above.

The invention is described above has the following advantageous features.

Since the voltage regulating circuit is provided in a mold package and fixed to the circuit housing of the case together with the heat sinks by a screw, and the in-line terminals are directly connected to a terminal formed in the conductors, vibration resistance and heat radiation effects can be improved, the size of the voltage regulator can be reduced, high reliability can be obtained, and the size and weight of the generator can be reduced by downsizing the voltage regulator.

The brush holder is separated from the voltage regulator to enable integration between the fan guide and the brush holder and between the cap holder and the case of the voltage regulator. In addition, when the the brush holder is installed in the case in such a manner that it is superimposed upon the case, electrical connection is effected at the same time as installation, thereby simplifying assembly work, making possible automation of the assembly of the voltage regulating circuit and connection of the in-line terminals, and reducing a maintenance burden on users.

Further, the brush holder is separated from the voltage regulator so that a ventilation flue can be formed between the voltage regulator and the fan guide, thereby further improving the cooling effect of the generator itself.

What is claimed is:

1. An AC generator for use in a vehicle comprising:
 a case formed from an insulating material, which includes a circuit housing for housing a voltage regulating circuit for regulating the output voltage of a generator and a connector case for housing a connector as an integrated unit;
 a bracket;
 a brush holder, formed from an insulating material, for housing a brush of the generator;
 conductors which are insert-molded within the case and form connectors in the connector case and form case connection terminals;

insert conductors forming brush holder connection terminals, said insert conductors being insert-molded with the brush holder and electrically connecting the brush holder to the connection terminals; and a heat sink for covering an opening of the circuit housing and cooling the voltage regulating circuit, wherein the voltage regulating circuit is provided in a mold package having terminals which are directly connected to the connection terminals formed by the conductors of the case and coupled to the circuit housing together with the heat sink, and the case and the brush holder are attached to the bracket of the generator in such a manner that the case and the brush holder are superimposed upon each other.

2. The AC generator for use in a vehicle according to claim 1, further comprising:

a cap holder for fixing a cap of the brush holder in a radial direction is molded so as to be integrated with the case having the circuit housing for housing the voltage regulating circuit and the connector case;

a flat portion provided in the brush holder such that the flat portion faces a cooling fan of the generator, said flat portion, an end surface of the cap holder and an end surface of the connector housing forming a fan guide.

3. The AC generator for use in a vehicle according to claim 1, further comprising a flat portion provided in the brush holder such that it faces a cooling fan of the generator and a ventilation flue formed between the flat portion and the circuit housing for housing the voltage regulating circuit so that cooling air passes through the fin of the heat sink to cool the voltage regulating circuit.

4. The AC generator for use in a vehicle according to claim 1, wherein:

the heat sink is attached to the bracket of the generator so that it is in close contact with the bracket.

5. The AC generator for use in a vehicle according to claim 1, wherein:

the case connection terminals of the case are provided on the side of the case facing the brush holder and the connection terminals in the brush holder are provided on the side of the brush holder facing the case, and the case and the brush holder are installed in such a manner that the case and the brush holder are superimposed upon each other and the connection terminals of the brush holder and the case are electrically connected.

6. The AC generator for use in a vehicle according to claim 1, further comprising:

a flat portion provided on an end surface of the brush holder and an end surface of the connector case to form a fan guide for a cooling fan of the generator, and, terminals to be connected to a rectifier located at a position where they are symmetrical about a line passing through the center of art axis of the generator and dividing the flat portion into two sections.

7. An AC generator for use in a vehicle comprising:

a rear bracket (2);

a brush (651);

a brush holder (69) molded from an insulating material and comprising:

an insert-molded insert conductor (691) which partially forms brush holder connection terminals (693) and electrically connects the brush with the brush holder connection terminals;

a brush holder attachment hole (697) provided in a side surface of the brush holder;

a flat portion (694) provided on a side surface remote from the side surface of the brush holder containing the attachment hole, and a cap (652);

a cap holder (616) for fixing the cap of said brush holder, said cap holder having an end surface (618);

a molded package (8);

a voltage regulator (6) attached to the rear bracket;

a voltage regulator case (61) molded from an insulating material and comprising:

a circuit housing (62);

a connector case (63) having an end surface (631);

a capacitor case (64); and a voltage regulator case attachment hole (617);

said voltage regulator case including conductors (611) insert molded within the voltage regulator case for coupling the voltage regulator with elements attached to the voltage regulator case, said conductors forming protruding connectors (612) of the connector case and first (613), second (614), and third (615) voltage regulator case connection terminals;

a heat sink (84) coupled to the circuit housing;

said voltage regulator case attachment hole being aligned with the brush holder attachment hole, said brush holder connection terminal being aligned with and electrically connected to the first voltage regulator case connection terminal, said end surface of the cap holder being flush with said end surface of the connector case, and said flat portion of the brush holder being flush with the end surface of the connector case.

8. The AC generator for use in a vehicle according to claim 7, wherein the molded package comprises:

a main body (81) formed by molding a semiconductor circuit;

molded package terminals (82) having an in-line structure and communicating directly with the conductors of the voltage regulator case; and a molded package hole (83) provided in part of the main body;

said molded package terminals being bent and inserted into holes in the third voltage regulator case connection terminal.

9. The AC generator for use in a vehicle according to claim 7, wherein:

said cap holder for fixing the cap being molded so as to be integrated with the voltage regulator case;

said flat portion being provided in the brush holder such that the flat portion faces a cooling fan (37) of the generator;

said flat portion of the brush holder, said end surface of the cap holder and said end surface of the connector housing forming a fan guide (74).

10. The AC generator for use in a vehicle according to claim 7, wherein the flat portion of the brush holder faces a cooling fan (37) of the generator, and the flat portion of the brush holder and the circuit housing of the voltage regulator case are spaced apart from each other so that a cooling air generated by the cooling fan may pass between the flat portion and the circuit housing to cool an armature coil (52).

11. The AC generator for use in a vehicle according to claim 7, wherein the main body of the molded package is sandwiched between the circuit housing of the voltage regulator circuit and the heat sink so that a heat generated by the generator is radiated to the heat sink.

12. The AC generator for use in a vehicle according to claim 9, wherein the cooling fan generates cool air that enters an intake port (21) of the rear bracket and passes through a fin of the heat sink to cool the heat sink and passes between the flat portion of the brush holder and the circuit housing to cool an armature coil (52).

13. The AC generator for use in a vehicle according to claim 7, wherein the heat sink is coupled to the rear bracket so that the heat sink is in close contact with the rear bracket.

14. The AC generator for use in a vehicle according to claim 7, wherein the first voltage regulator case connection terminal is provided on a side of the voltage regulator case which is facing the brush holder, and the brush holder connection terminals are provided on a side of the brush holder that faces the voltage regulator case, whereby the voltage regulator case and the brush holder are superimposed upon each other during installation and fastened with a screw (91) so that the brush holder connection terminals and the first voltage regulator case connection terminal are press contacted to each other.

15. The AC generator for use in a vehicle according to claim 14, wherein the voltage regulator case attachment hole is aligned with the brush holder attachment hole so that the voltage regulator is attached to the rear bracket.

16. The AC generator for use in a vehicle according to claim 7 wherein the second voltage regulator case connection terminal is electrically connected to a rectifier (7).

17. The AC generator for use in a vehicle according to claim 8 wherein said molded package and said heat sink are fixed to the voltage regulator case by a screw (85) through the molded package hole.

18. The AC generator for use in a vehicle according to claim 7 further comprising a sealing resin being disposed around the circuit housing and the heat sink.

19. The AC generator for use in a vehicle according to claim 7 further comprising a tap provided on the first voltage regulator case connection terminal so that the first voltage regulator case connection terminal is screwed with a screw (9) for electrical connection between the voltage regulator case connection terminal and the brush holder connection terminals.

* * * * *